United States Patent

Star

[15] 3,634,946
[45] Jan. 18, 1972

[54] DIGITAL COMPASS

[72] Inventor: Joseph Star, Roslyn Heights, N.Y.
[73] Assignee: Lundy Electronics & Systems, Inc., Glen Head, N.Y.
[22] Filed: Feb. 10, 1969
[21] Appl. No.: 797,843

[52] U.S. Cl. ...........................33/224, 235/150.26, 33/1 PT
[51] Int. Cl. ................................G01c 17/30, G01c 17/38
[58] Field of Search.............................33/204.3–204.44, 33/125 W, 1 PT; 324/45, 47; 235/150.26; 343/5 DP, 106

[56] References Cited

UNITED STATES PATENTS

| 2,176,197 | 10/1939 | Bentley | 33/204 E |
| 2,464,057 | 3/1949 | Phair | 33/204 FA |
| 2,680,241 | 6/1954 | Gridley | 31/1 PT UX |
| 3,099,090 | 7/1963 | Frisch | 33/46 |
| 3,129,402 | 4/1964 | Henne | 340/1 C UX |
| 3,197,880 | 8/1965 | Rice et al. | 33/204 D |
| 3,298,027 | 1/1967 | Stover | 343/5 DP X |
| 3,365,799 | 1/1968 | Fisher | 33/125 W |
| 3,445,761 | 5/1969 | Loughead | 33/204 E X |

FOREIGN PATENTS OR APPLICATIONS 685,506    4/1964    Canada................................33/204.3

Primary Examiner—Robert B. Hull
Attorney—Brumbaugh, Graves, Donohue & Raymond

[57] ABSTRACT

A digital compass system is provided by continuously and repetitively scanning a magnetic field with a field direction-sensing device, producing a first signal when the device is aligned in a reference direction, and producing a second signal when the sensing device is aligned in a predetermined manner with the total magnetic field at the point of exposure. Spatially related pulses occurring between the two signals are counted to provide a digital output representative of heading.

17 Claims, 7 Drawing Figures

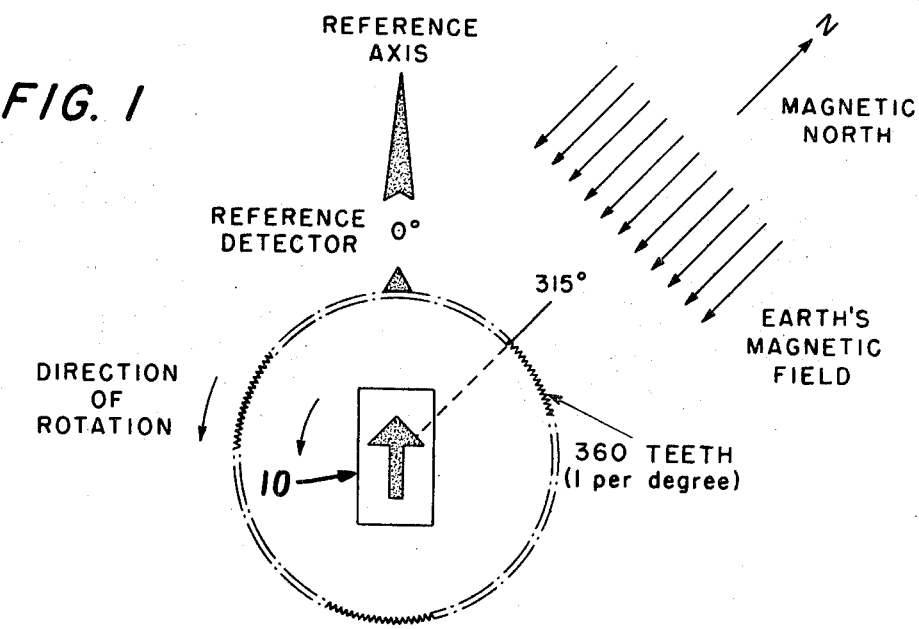
FIG. 1
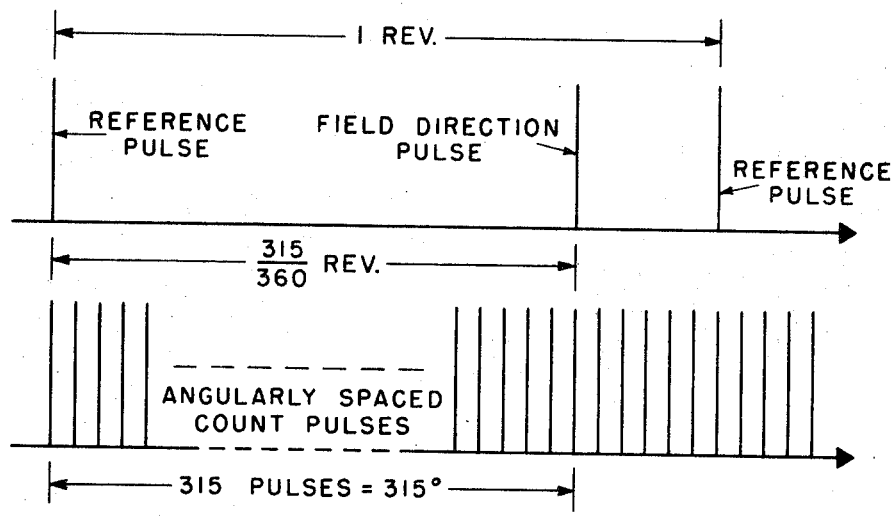
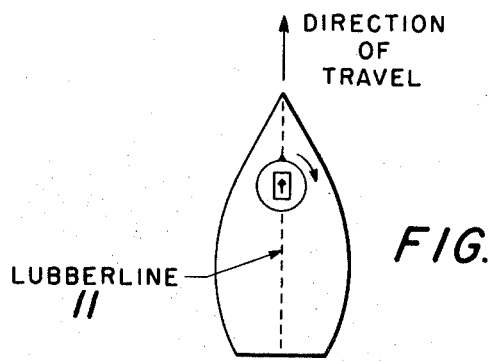
FIG. 1A
INVENTOR.
JOSEPH STAR

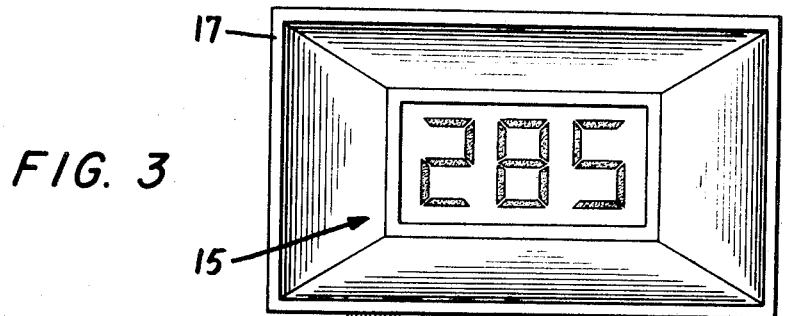
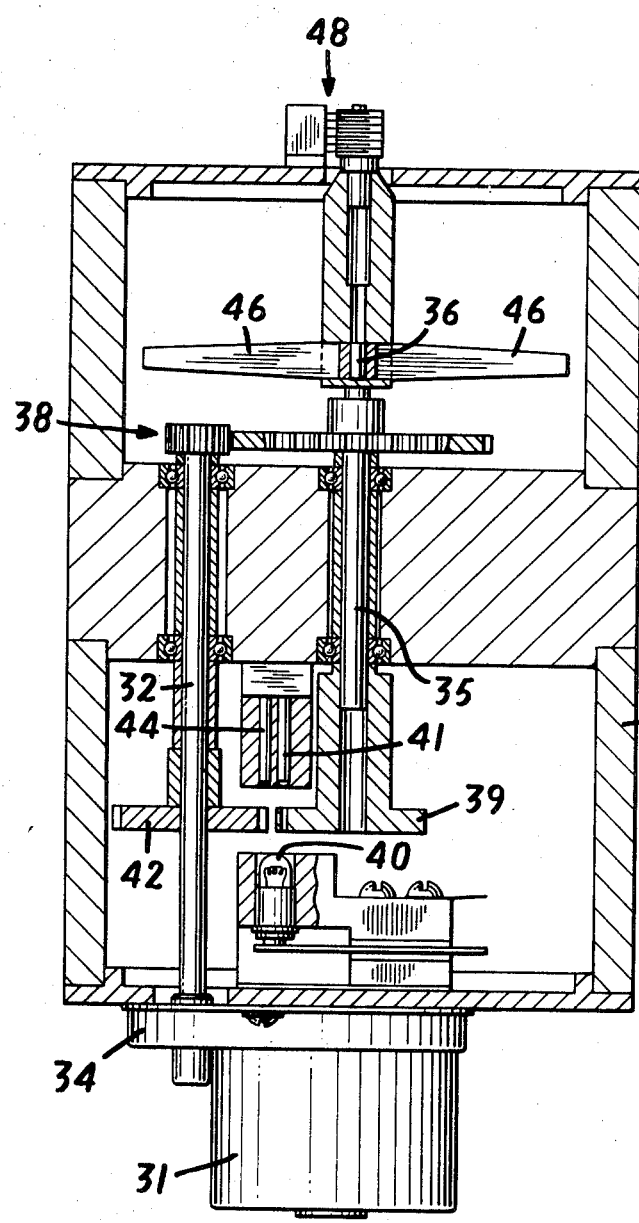

DIGITAL COMPASS

The present invention relates to compass systems for determining the direction of an established or slowly varying magnetic field, or the heading of a vehicle traveling or positioned in an established magnetic field, and, more particularly, to novel and improved digital methods and systems for sensing the total magnetic field and producing a digital output representative of its direction or the heading of the vehicle.

The earth can be considered to have a bar magnet embedded within its sphere. The earth's magnetic field can then be represented by lines of force which emanate out of the surface of the earth, pass through the surrounding atmosphere and space, and return into the surface of the earth. The total magnetic field at any one point in the earth, or at its surface, or above it is vectorial and varies in intensity and direction at different locations. The total magnetic field vector is only parallel to the earth's surface near the equator. In the northeastern part of the United States in New York, for example, the dip angle or inclination of the earth's total magnetic field vector is about 71° from the horizontal. Accordingly, the total magnetic field vector at that longitude and latitude is on the order of 0.57 oersted, whereas the horizontal component is only on the order of 0.18 oersted. A conventional compass utilizes the effect of the earth's much stronger gravitational force to obtain a horizontal position and thus a balanced magnetic compass needle fundamentally responds only to the relatively weak horizontal component of the magnetic field. For this reason there is a decided advantage in any compass system which responds to the total magnetic field strength available at the point of exposure.

In accordance with the invention, a digital compass system is provided in which a first pulse or output signal is produced when the carrier for a magnetic field-sensing means, such as a gimbaled "Hall Effect" device or sensor is aligned with a reference direction such as the longitudinal axis or lubberline of the vehicle. The sensing means is rotated or scans the earth's magnetic field generating a single pulse or output signal at the instant that the sensor is in a condition of orthogonality with the total magnetic field vector.

A digital output may be produced by counting a number of spatially related signal pulses between the occurrence of the field direction-sensing pulse and the reference direction pulse. The spatially related pulses may be derived in any suitable manner such as photoelectrically, mechanically, or electronically in spatial or rotational or phase synchronism with the rotation or scanning of the sensor. The speed of rotation is not critical and can be any convenient speed; it is only required to produce the spatially related pulses as the sensor rotates.

In the compass system of the invention, the digital output as determined by the spatially related pulse count may be representative of the magnetic heading. If desired, the count may be selectively modified in a conventional digital manner to compensate for the magnetic "variation," or "declination," between the magnetic and geographic poles, for example.

Like conventional horizontally gimbaled compasses, there is provided in accordance with the invention a magnetic field angular measurement in the horizontal plane when the sensing element is properly gimbaled.

Commonly, the measurements are made on an analog basis in which it is necessary to maintain the integrity of the continuous waveforms of the system. In accordance with the present invention, however, the information originates in digital form at the outset and thus benefits from the precision, ease of processing, and understandability of display which is characteristic of digital systems.

For a more complete understanding of the invention, reference may be had to the following detailed description taken in conjunction with the accompanying figures of the drawings, in which:

FIG. 1 is a pictorial representation of an exemplary method of digital determination of heading, in accordance with the invention;

FIG. 1A depicts the heading determination system of the invention as applied to a vehicle such as a boat;

Figure 2:
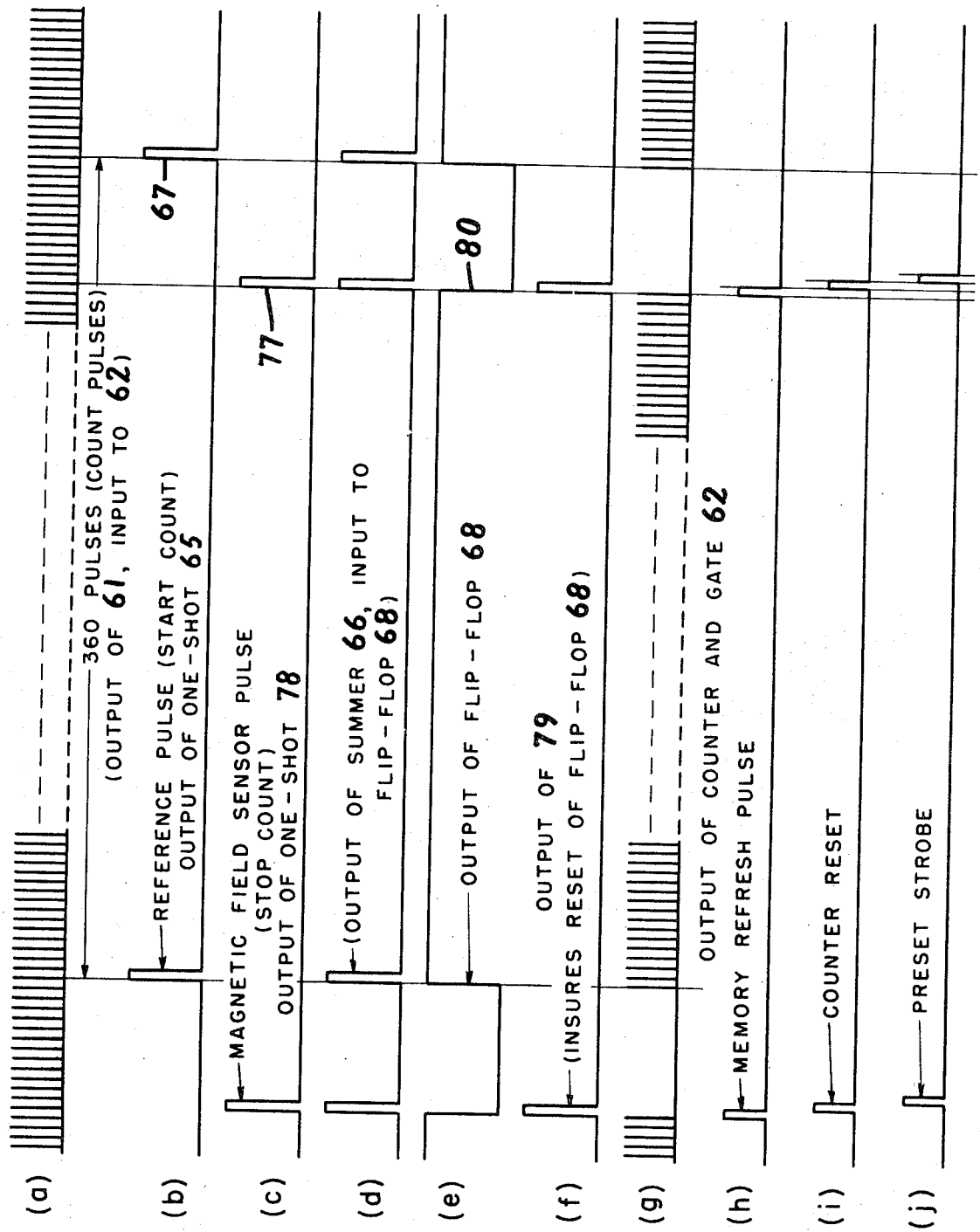
Figure 5A:
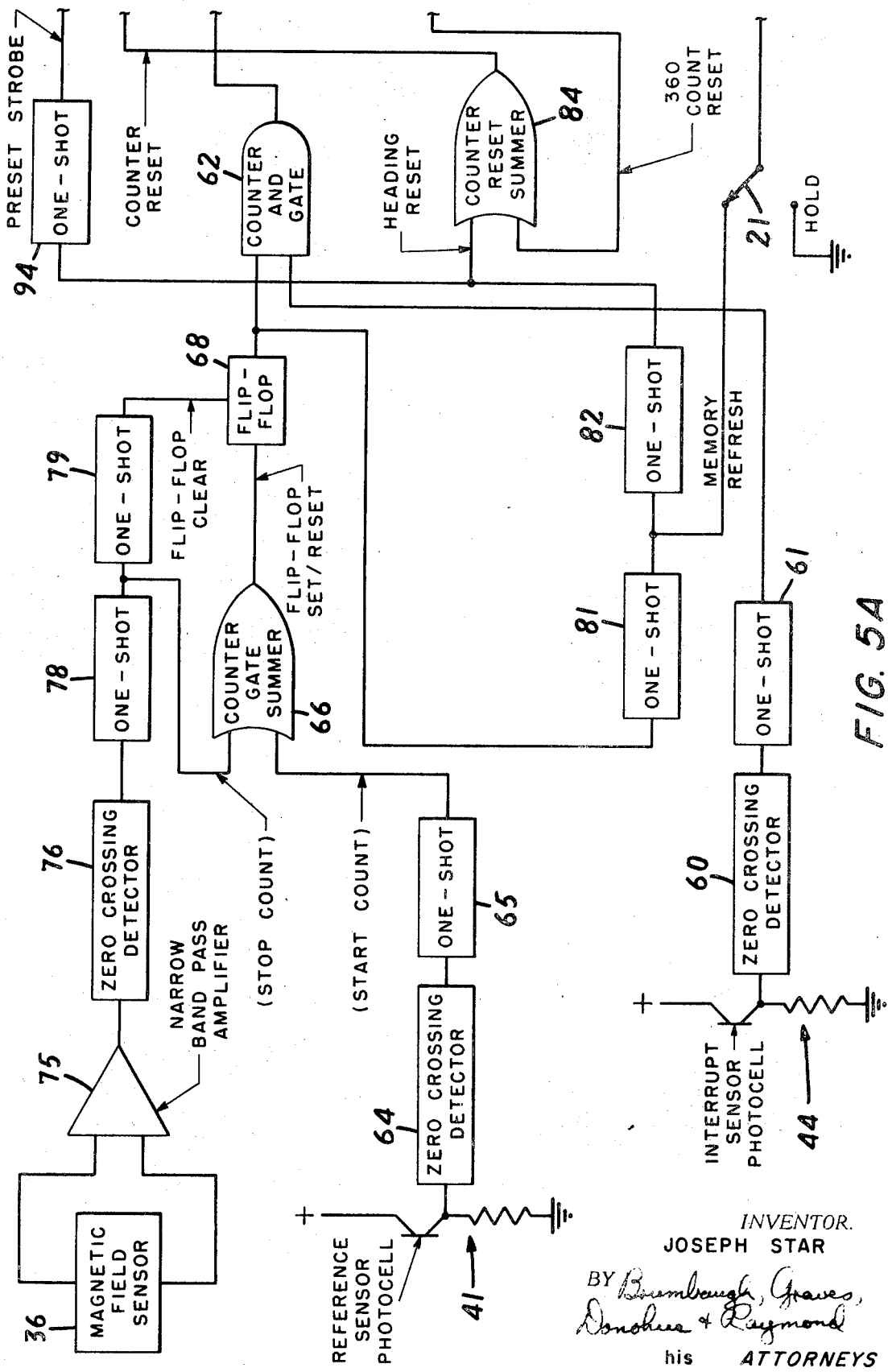
Figure 5B:
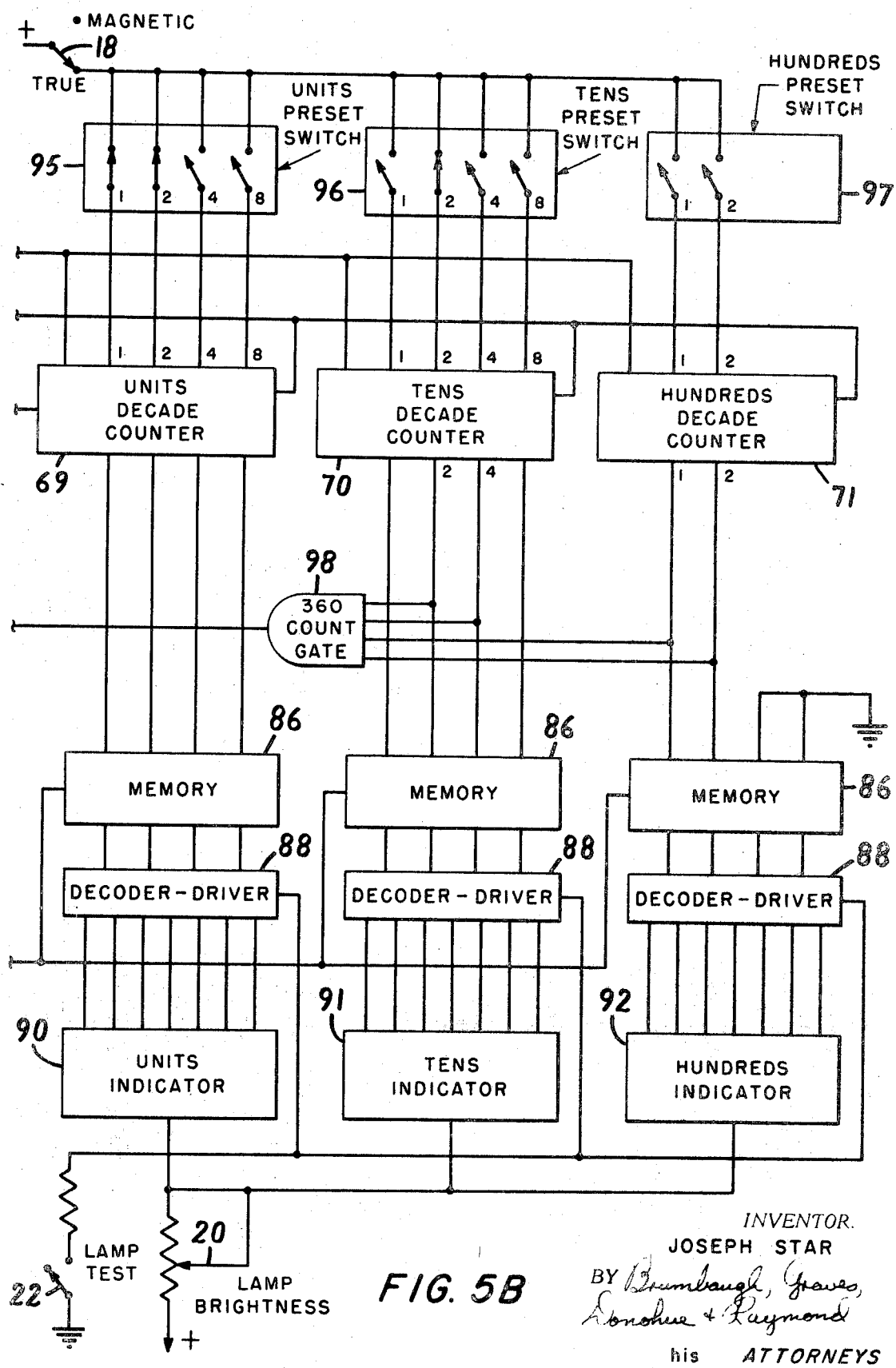

FIGS. 2a through j are a set of spatially related pulse signal diagrams in accordance with an exemplary embodiment of the invention;

FIG. 3 is a pictorial representation of an exemplary embodiment of a visual indicator and control panel positioned at or adjacent the vehicle operator's station;

FIG. 4 is a cross-sectional elevation of the details of an exemplary embodiment of a mechanically driven sensor; and FIGS. 5A and 5B are an electrical schematic block diagram of an exemplary digital output producing system, in accordance with the invention.

As shown in FIGS. 1 and 1A, the method of digital determination of heading involves the rotation of a magnetic field direction sensor 10 wherein once each revolution a reference pulse is produced when the carrier of the sensor 10 is aligned with a selected reference direction such as the longitudinal axis or lubberline 11 (FIG. 1A) of the vehicle, and a magnetic field direction pulse is produced when the sensor 10 is aligned in some predetermined manner with the direction of the earth's magnetic field. Angularly spaced count pulses occurring between the reference pulse and the direction pulse are produced in any suitable manner in spatial synchronism with the rotation of the sensor 10 and may be counted in some suitable manner to provide a digital output representative of the heading. The spacing between the pulses may be arbitrarily selected so that the pulses each represent some angular increment of scan, such as one pulse per degree.

The sensor 10 is preferably positioned on or parallel to a lubberline at a location as remote as possible from sources of variable magnetic disturbance such as rotating equipment, etc. For example, it may be positioned on the masthead of a small boat. Conventional magnetic field compensating means may be used on or about the housing of the sensor 10 or at other appropriate locations to compensate for magnetic anomalies. When utilized in transportational applications, the sensor 10 should be gimbaled in a suitable conventional manner and preferably stabilized in a horizontal plane.

A visual indicator or display device 15 and control plane 16 in any suitable housing (FIG. 3) is mounted at the operating station, such as the cockpit of a boat.

The visual indicator 15 may include a plurality of conventional selectively illuminated, numeric indicating means such as seven-segment indicators, each capable of presenting any of the digits 0-9 in a predetermined size readily visible from any reasonable point of observation. The visual display is preferably shielded by a suitable shroud 17 from extraneous illumination.

The control panel 16 may include a selector switch 18 for selectively conditioning the compass system to an Off condition, or alternatively providing a readout representative of the "magnetic" heading or the "True" geographic heading.

In conventional navigation, information is readily available as to the magnetic "variation," or "declination," i.e., the angular difference between magnetic and geographic poles at the general location of the compass. The "variation" may be selectively introduced into the compass system by the use of conventional ten-position thumb wheels 19 with associated visual indicators.

Brightness of the display may be selectively controlled in a conventional manner by a "brightness" control knob 20, concentrically mounted in front of the selector knob 18.

If it is desired to hold the visual indication of the displayed heading irrespective of changes in actual heading for the purpose, for example, of recording data or making navigational computations, a "hold" button 21 may be provided.

Any suitable indicator lamp test and/or circuitry test can be selectively energized by the use of a lamp test button 22.

The exemplary embodiment of the sensor 10 (FIG. 4) includes a housing 30 which is intended to be suitably gimbaled (not shown) for relatively free universal movement with respect to the vehicle on which it is mounted. A suitable power drive source 31, which may be electrical or mechanical, is mounted on the housing 30 and drives a shaft 32 at a selected speed of rotation through an intermediate gear train 34. The shaft 32 in turn drives a carrier shaft 35 upon which a magnetic field direction-sensing means 36 is fixedly mounted with its sensing axis perpendicular thereto, through a suitable gear train 38, having a predetermined gear ratio such as 5:1.

A starting gate sensor 39 of suitable conventional form is fixedly mounted on the carrier shaft 35 and rotates with and at the same speed as the direction-sensing means 36. In the exemplary embodiment, the starting gate sensor 39 is a single apertured disk which acts as a light gate to permit detection of light from a light source 40 by a conventional photoelectric device 41 functioning as a reference sensor (FIG. 5A) at the instant the sensor is aligned with the selected reference direction such as the lubberline of the boat. This provides the reference pulse of FIG. 1.

The angularly spaced count pulses are generated, for example, by a toothed gear or apertured light gate 42 fixedly mounted on the shaft 32, with the intervals between the teeth passing light from the common light source 40 to a photoelectric sensing device 44, functioning as a reference or interrupt sensor (FIG. 5A). In the preferred embodiment, the light gate 42 has 72 teeth or apertures. Since the shafts 32 and 35 are rotating in a 5:1 ratio, there is provided a pulse output of the photoelectric interrupt sensor 44 for each degree of scan or rotation of the sensor 36.

In order to enchance the sensitivity of the magnetic field direction-sensing means 36, which may be a conventional Hall Effect device, flux-concentrating wings 46 are positioned about the sensor 36 in a suitable manner. In the case of a Hall device sensor 36, the flux-concentrating wings 46 are designed to maximize the slope at the angularly occurring magnetic field null, and to have maximum response to improve the signal/noise ratio, especially in the vicinity of the null.

The electrical output of the magnetic field direction-sensing means 36 is taken off through a suitable conventional slipring device 48.

DIGITAL OUTPUT SYSTEM (FIGS. 5A and 5B)

The digital output of the compass system may be produced by the following exemplary circuitry:

As the sensor 36 rotates (e.g., 2 revolutions per second), the interrupt sensor photocell 44 generates 360 pulses (FIG. 2a) per revolution which are suitably shaped by a conventional zero crossing detector 60 and a one-shot multivibrator 61, and then fed to one input of a counter AND-gate 62.

The reference sensor photocell 41 generates one pulse (FIG. 2b) per revolution in angular or spatial or phase synchronism (to differentiate from frequency synchronism) with the output of the interrupt sensor 44. The reference pulse is shaped by a conventional zero crossing detector 64 and a one-shot multivibrator 65, and then fed to an input of a suitable counter gate summer 66. The output of the summer 66 (leading edge 67 of the reference pulse) sets the output of a conventional set/reset flip-flop 68 to a logical 1 thereby enabling counter AND-gate 62. Thus the interrupt count pulse from the one-shot 61 pass through a gate 62 to the input to the units decade counter 69, and the counter (which comprises units decade counter 69, tens decade counter 70, and hundreds decade counter 71) begins to count.

The output of magnetic field sensor 36 is amplified preferably by a suitable narrow band-pass amplifier 75 which is operative at the rotational frequency (e.g., 2 rev./sec.) of the sensor to minimize external periodic and transient magnetic and electrical disturbances. The output of the amplifier 75 is shaped in a zero crossing detector 76 and a one-shot 78 to produce the magnetic field sensor "stop" pulse (FIG. 2c) which is fed to a second input of the counter gate summer 66. The leading edge 77 of this pulse resets the flip-flop 68 and, therefore, disables the counter AND-gate 62 to prevent passage of any additional count pulses (FIG. 2a) to the units decade counter 69. The counter stops counting and remains at its then total count until reset. To ensure that operation, the reference pulse enables the counter AND-gate 62, and the magnetic field sensor pulse disables the counter AND-gate 62. The output of the zero crossing detector 76 and the one-shot 78 is fed to a suitable one-shot multivibrator 79. The output of one-shot 79 (FIG. 2f) clears flip-flop 68. This ensures that counter AND-gate 62 is disabled prior to the start of any cycle.

The trailing edge 80 of the output (FIG. 2e) of flip-flop 68 triggers one-shot multivibrator 81 which rapidly on its leading edge produces a memory refresh pulse (FIG. 2h) to clear counter memories as described hereinafter. The output of one-shot 81 is also fed through a one-shot multivibrator 82 to a suitable counter reset summer 84, the output of which (FIG. 2i) resets the counter (69, 70, and 71) to zero or any desired preset condition as will be described hereinafter. Upon reset of the counter (69, 70, and 71), the system is ready for a new counting cycle.

Each of the decade counters 69, 70, and 71 have their outputs connected to respective conventional memory circuits 86, which in turn are connected to conventional decoder-drivers 88. The decade counters 69, 70, and 71 may jointly comprise a conventional three decade binary-code decimal counter, such as three Signetics 8280 integrated circuit decade (BCD) counters, having four output leads representative of the BCD code (0–9). The memories 86 and associated decoder-drivers may also be suitable commercially available decoder-drivers with memory.

The respective decoder-drivers 88 convert the BCD code into the appropriate readout indicator code, such as a seven segment type, for example, to suitably energize or illuminate the lamps of the respective units indicator 90, tens indicator 91 and hundreds indicator 92, which may be of any suitable conventional form.

At the beginning of each counting cycle, counting pulses are fed to the counter (69, 70, and 71) and a count is registered therein in digital form, such as BCD or excess 3 or other suitable code. At the end of the counting cycle as previously explained, the magnetic field sensor pulse starts a sequence which produces the memory refresh pulse in the output of one-shot 81. With the "Hold" button 21 in its normal unoperated condition, as shown in FIG. 5A, the memory refresh pulse is fed to each of the memories 86 to clear them of the previous entry. The memory refresh pulse is of very short duration, e.g., less than 1 microsecond. The memories 86 are then operatively connected to their respective counters 69, 70, and 71 and substantially instantaneously store the code indications or count then registered therein. The counter (69, 70, 71) is then reset by the counter reset pulse from the summer 84. This entire sequence takes place within substantially less than the normal time interval between any two interrupt sensor count pulses. The decoder-drivers 88 selectively energize their respective indicators 90, 91, and 92.

This system has the capability to preset the counter to any reading from zero to 360 for the purposes of correcting for easterly or westerly local magnetic "variation," or "declination," in a particularly geographic area thus obtaining a "True" geographic reading. This preset number is injected into the counter after the counter is reset to zero. Therefore, by triggering one-shot multivibrator 94 on the trailing edge of one-shot 82, a preset strobe or pulse is generated at the correct time to set the counter (69, 70, and 71) to whatever count had been set in the respective preset switches 95, 96, and 97 by the thumb switches 19. The counter then begins to count at the preset count. This preset function only takes place in the exemplary embodiment when selector switch 18 is in the position shown in FIG. 5B.

Since the system should not generate a count greater than 360, when the hundreds decade counter 71 has the output of binary 3 and the tens decade counter 70 has a binary output of 6, this condition is detected by a suitable 360-count gate 98. A 360-count reset, therefore, upon entering summer 84 will reset the counter to zero, thereby eliminating the possibility of readings greater than 360. For example, if the total number of interrupt pulses entering the counter between the occurrence of the reference pulse and the magnetic field sensor pulse is 355 (the magnetic heading), and the preset reading in order to obtain the "True" heading is +15 ("variation," or "declination," is 15° east), the counter will start counting from 15. When the counter accumulates 360 counts, it resets due to the 360-count reset. Since this reset occurs very rapidly, in much less time than two adjacent interrupt pulses, the counter does not hesitate and, therefore, accumulates the remaining 10 counts starting anew from zero, thereby causing a "True" heading display of 010 on the indicators.

The presetting of the counter accomplishes in an automatic way the magnetic "variation," or "declination," compass adjustment necessary when traveling in a particular geographic area. For example, in the vicinity of western Florida, the variation is 2° east. It is, therefore, necessary that for a "True" geographic compass reading, the count of 2 must be inserted into the counter prior to the count cycle. If the particular location of the compass is Long Island, New York, the variation is 12° west. Thus the thumb wheels are preset to 360−12=348. If the preset switches 95, 96, and 97 are set at other than 000 and the magnetic heading is required, the switch 18 is turned from True to Magnetic. This effectively cancels the presetting switch positions.

Another feature of the system is the ability to hold a particular compass heading. This is accomplished by not allowing the output of one-shot 81 to reset the display memories 86. Throwing switch 21 to the "Hold" position ensures this condition. As long as switch 21 is in "Hold," the reading of the indicator does not change (even though the system is still operating and computing new headings).

To ensure the validity of the display device, it may be tested by throwing the Test switch 22. In the exemplary embodiment shown, this only tests for a defective lamp, not for the complete system. However, other suitable tests can readily be conducted by suitable conventional circuitry.

Thus there is provided in accordance with the invention novel and improved methods and systems for determining heading, be it magnetic, geographic or some predetermined variant thereof, in a completely digital manner.

It will be obvious to those skilled in the art that the above-described embodiment is meant to be merely exemplary and that it is susceptible of modification and variation without departing from the spirit and scope of the invention. For example, whereas for one particular system sensitivity it may be desirable to have one count pulse per degree, the system can readily be made more or less sensitive by varying the spatial relation and number of the count pulses. Furthermore, whereas the count was started in the exemplary embodiment by the reference pulse, it may be desirable to start the count with the magnetic field direction-sensing pulse and stop it with the reference pulse. This can be accomplished if 41 feeds 76, and 36 and 75 feed 64 on FIG. 5A, and the direction of system rotation is reversed. It will also be apparent that the digital output of the system is readily susceptible of a wide variety of conventional digital modification and processing.

Therefore, the invention is not deemed to be limited except as defined by the appended claims.

I claim:

1. A digital compass system, comprising magnetic field-sensing means for repetitively scanning in successive scanning intervals an established or slowly changing magnetic field and sensing the direction of said field once during each of said respective repetitive scanning intervals, means for sensing once during each such scanning interval a predetermined reference direction relative to the system, and means responsive to the sensing of the direction of said magnetic field and of said reference direction for producing a distinctive digital output coextensive with that part of each scanning interval which is representative of the heading of the reference direction relative to the direction of the established magnetic field.

2. A digital compass system as claimed in claim 1, further comprising means for converting said digital output to one or more direct visual representations of the heading.

3. A digital compass system for a vehicle adapted to travel within an established magnetic field, comprising magnetic field-sensing means for repetitively scanning in successive scanning intervals the established magnetic field and sensing the direction of said field once during each of said respective repetitive scanning intervals, means for scanning once during each such scanning interval a predetermined reference direction relative to the system, and means responsive to the sensing of the direction of said magnetic field and of said reference direction for producing a distinctive digital output coextensive with that part of each scanning interval representative of the heading of said reference direction relative to the magnetic field.

4. A digital compass system as claimed in claim 3, further comprising means for converting said digital output to a direct visual representation of the heading.

5. A digital compass system as claimed in claim 3 further comprising means for adjusting said digital output in correspondence with the known magnetic field variation at the geographic location of the vehicle.

6. A digital compass system, comprising magnetic field-sensing means for producing a distinctive output signal when positioned within a magnetic field in a predetermined spatial relation thereto representative of the direction of the magnetic field through the sensing means, directional-sensitive means for producing an output signal when aligned in a predetermined reference direction relative to said system, and means responsive to said field-sensing means output signal and said reference direction output signal for producing a digital output representative of the relative angular difference of the magnetic field direction and said reference direction.

7. In a digital compass as claimed in claim 6, said digital output producing means including a source of spatially related count pulse signals representative of angular increments in space to determine said digital output, and means responsive to said field-sensing means output signal and said reference direction output signal for determining the quantity of count pulse signals controlling said digital output.

8. A digital compass system, comprising a housing, gimbal means mounted on said housing, a carrier shaft universally tiltably supported within the housing on said gimbal means, a magnetic field direction-sensing device fixedly positioned on the carrier shaft, means for continuously rotating said carrier shaft about its axis, means for producing a first output signal when said field direction-sensing device is substantially orthogonal with respect to the total magnetic field to which it is exposed, means for producing a second output signal when said sensing axis is positionally oriented in a reference direction, means for producing angularly spaced pulse signals in synchronism with the rotation of said carrier shaft representative of angular increments of rotation of said carrier shaft about its axis, counting means responsive to said pulse signals, means responsive to said first and second output signals for determining the number of said pulse signals to which said counting means is responsive, and means for producing a digital output representative of the count of said counting means.

9. A digital compass system as claimed in claim 8, said magnetic field direction sensing device being a Hall Effect device.

10. A digital compass system as claimed in claim 8, further comprising means for converting said digital output into a direct visual representation of heading.

11. A digital compass system as claimed in claim 8, further comprising means for adjusting the count of said counting means in correspondence with the known magnetic field variation at the system situs.

12. A digital compass system as claimed in claim 8, further comprising means for resetting said counting means once each revolution of said carrier shaft, and means for selectively, maintaining said digital output constant for readout purposes irrespective of changes in the count of said counting means.

13. A digital compass system as claimed in claim 8, further comprising means for limiting the maximum count registered in said counting means to a predetermined count, and means for resetting said counting means when said count exceeds said predetermined count.

14. A digital compass system as claimed in claim 8, in which said second output signal enables said counting means to be responsive to said pulse signals, and said first output signal disables said counting means from being responsive to additional ones of said pulse signals.

15. A method for determining the heading from a point of observation within an established magnetic field, comprising the steps of scanning the established magnetic field with a magnetic field direction sensing device which produces a null signal at the instant that its sensing axis is in a condition of orthogonality with the total magnetic field vector, producing in synchronism with the scanning a repetitive series of spaced-apart signal pulses representative of predetermined angular scanning increments, and counting the number of such signal pulses occurring between a predetermined reference direction of said sensing axis relative to the compass and the condition of orthogonality to produce a digital output signal representative of the heading.

16. A method as claimed in claim 15, comprising the further step of providing a visual indication of heading as a function of the digital output.

17. A method as claimed in claim 15, further comprising the step of adjusting the signal pulse count in correspondence with the known magnetic field variation at the geographic location of the vehicle.

* * * * *